(12) United States Patent
Falco et al.

(10) Patent No.: US 9,535,862 B2
(45) Date of Patent: Jan. 3, 2017

(54) SYSTEM AND METHOD FOR SUPPORTING A SCALABLE MESSAGE BUS IN A DISTRIBUTED DATA GRID CLUSTER

(71) Applicant: Oracle International Corporation, Redwood Shores, CA (US)

(72) Inventors: Mark Falco, Burlington, MA (US); Alex Gleyzer, Waltham, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 553 days.

(21) Appl. No.: 14/020,412

(22) Filed: Sep. 6, 2013

(65) Prior Publication Data

US 2014/0075078 A1  Mar. 13, 2014

Related U.S. Application Data (60) Provisional application No. 61/698,216, filed on Sep. 7, 2012, provisional application No. 61/701,453, filed on Sep. 14, 2012.

(51) Int. Cl.
*G06F 13/20* (2006.01)
*G06F 13/42* (2006.01)
(Continued)

(52) U.S. Cl.
CPC .............. *G06F 13/20* (2013.01); *G06F 9/546* (2013.01); *G06F 13/42* (2013.01); *H04L 67/1097* (2013.01); *G06F 2209/547* (2013.01)

(58) Field of Classification Search
CPC .......... G06F 9/546; G06F 13/20; G06F 13/42; G06F 2209/547
See application file for complete search history.

(56) References Cited

U.S. PATENT DOCUMENTS

| 8,099,488 B2 * | 1/2012 | Laye .................... H04L 12/2602 709/224 |
| 8,751,626 B2 * | 6/2014 | Pinkston ................. G06F 9/546 709/223 |

(Continued)

FOREIGN PATENT DOCUMENTS

EP  1 684 173  7/2006

OTHER PUBLICATIONS

Taboada, G. L. et al., Efficient Java Communication Libraries Over InfiniBand, 2009 11th IEEE International Conference on High Performance Computing and Communications, IEEE, Piscataway, NJ, USA, Jun. 25, 2009, pp. 329-338, 10 pages.
(Continued)

*Primary Examiner* — Brian Misiura
(74) *Attorney, Agent, or Firm* — Tucker Ellis LLP (57) ABSTRACT

A system and method can a scalable message bus in a distributed data grid. The system can provide a plurality of message buses in the distributed data grid, wherein the distributed data grid includes a plurality of cluster members and provides a plurality of services. Furthermore, the system can associate each said service in the distributed data grid with a said message bus, and use the plurality of message buses to support data transferring between different services on different cluster members in the distributed data grid. Additionally, the system can use a datagram layer to support clustering in the distributed data grid, and bypass the datagram layer in the distributed data grid for data transferring.

20 Claims, 10 Drawing Sheets

(51) Int. Cl.
　　　*H04L 29/08*　　　(2006.01)
　　　*G06F 9/54*　　　(2006.01)

(56) References Cited

U.S. PATENT DOCUMENTS

| | | | | |
|---|---|---|---|---|
| 8,805,984 B2* | 8/2014 | Markus | ................... | G06F 9/466 |
| | | | | 709/223 |
| 2002/0078126 A1 | 6/2002 | Higgins | | |
| 2005/0080982 A1 | 4/2005 | Vasilevsky et al. | | |
| 2013/0041969 A1* | 2/2013 | Falco | ..................... | G06F 9/541 |
| | | | | 709/212 |
| 2014/0075071 A1* | 3/2014 | Falco | ..................... | G06F 9/546 |
| | | | | 710/107 |

OTHER PUBLICATIONS

Sur, S. et al., RDMA Read Based Rendezvous Protocol for MPI Over InfiniBand: Design Alternatives and Benefits, Proceedings of the Eleventh ACM SIGPLAN Symposium on Principles and Practice of Parallel Programming, PPOPP '06, New York, New York, USA, Jan. 1, 2006, pp. 32-39, 8 pages.
International Search Report and Written Opinion dated Jan. 2, 2014, International Application No. PCT/US2013/058605 filed Sep. 6, 2013, 10 pages.
International Search Report and Written Opinion dated Jan. 2, 2014, International Application No. PCT/US2013/058610 filed Sep. 6, 2013, 10 pages.

* cited by examiner

SYSTEM AND METHOD FOR SUPPORTING A SCALABLE MESSAGE BUS IN A DISTRIBUTED DATA GRID CLUSTER

CLAIM OF PRIORITY

This application claims priority on U.S. Provisional Patent Application No. 61/698,216, entitled "SYSTEM AND METHOD FOR SUPPORTING A SCALABLE MESSAGE BUS IN A DISTRIBUTED DATA GRID CLUSTER" filed Sep. 7, 2012, and U.S. Provisional Patent Application No. 61/701,453, entitled "SYSTEM AND METHOD FOR SUPPORTING EXTERNAL CONFIGURATION AND DEPENDENCY INJECTION FOR A SERVER SYSTEM IN A MIDDLEWARE ENVIRONMENT" filed Sep. 14, 2012, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. In areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

Furthermore, modern applications have embraced scale out architecture as a solution to the challenges of cost, scale and application reliability and serviceability. This approach offers many advantages over legacy approaches which are typically dependent on using increasingly large and costly high-end servers. However, this approach generally suffers from one persistent and challenging limitation: the input/output (I/O) bottleneck. Thus, the performance and efficiency of modern highly distributed systems may be constrained by the communication mechanism that connects all of the system components.

This is the general area that embodiments of the invention are intended to address.

SUMMARY

Described herein are systems and methods that can support a scalable message bus in a distributed data grid. The system can provide a plurality of message buses in the distributed data grid, wherein the distributed data grid includes a plurality of cluster members and provides a plurality of services. Furthermore, the system can associate each said service in the distributed data grid with a said message bus, and use the plurality of message buses to support data transferring between different services on different cluster members in the distributed data grid. Additionally, the system can use a datagram layer to support clustering in the distributed data grid, and bypass the datagram layer in the distributed data grid for data transferring.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the embodiments of the invention as following uses a Coherence distributed data grid as an example for a distributed data grid. It will be apparent to those skilled in the art that other types distributed data grids can be used without limitation. Furthermore, the description of the invention as following uses an Exabus messaging mechanism as an example for a messaging mechanism. It will be apparent to those skilled in the art that other types messaging mechanisms can be used without limitation.

Described herein are systems and methods that can support a scalable message bus in a distributed data grid cluster. The scalable message bus can provide each service with its own bus (transport engine). The distributed data grid can take advantage of a pool of input/output (I/O) threads to deserialize inbound messages before they are delivered to the addressed service, and can relieve the bottleneck that is caused by performing all message deserialization in a single threaded fashion before the message type can be identified and offloaded to the thread-pool within the distributed data grid. Additionally, the distributed data grid allows incoming messages to be pre-processed on the I/O thread for the scalable message bus.

Distribute Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
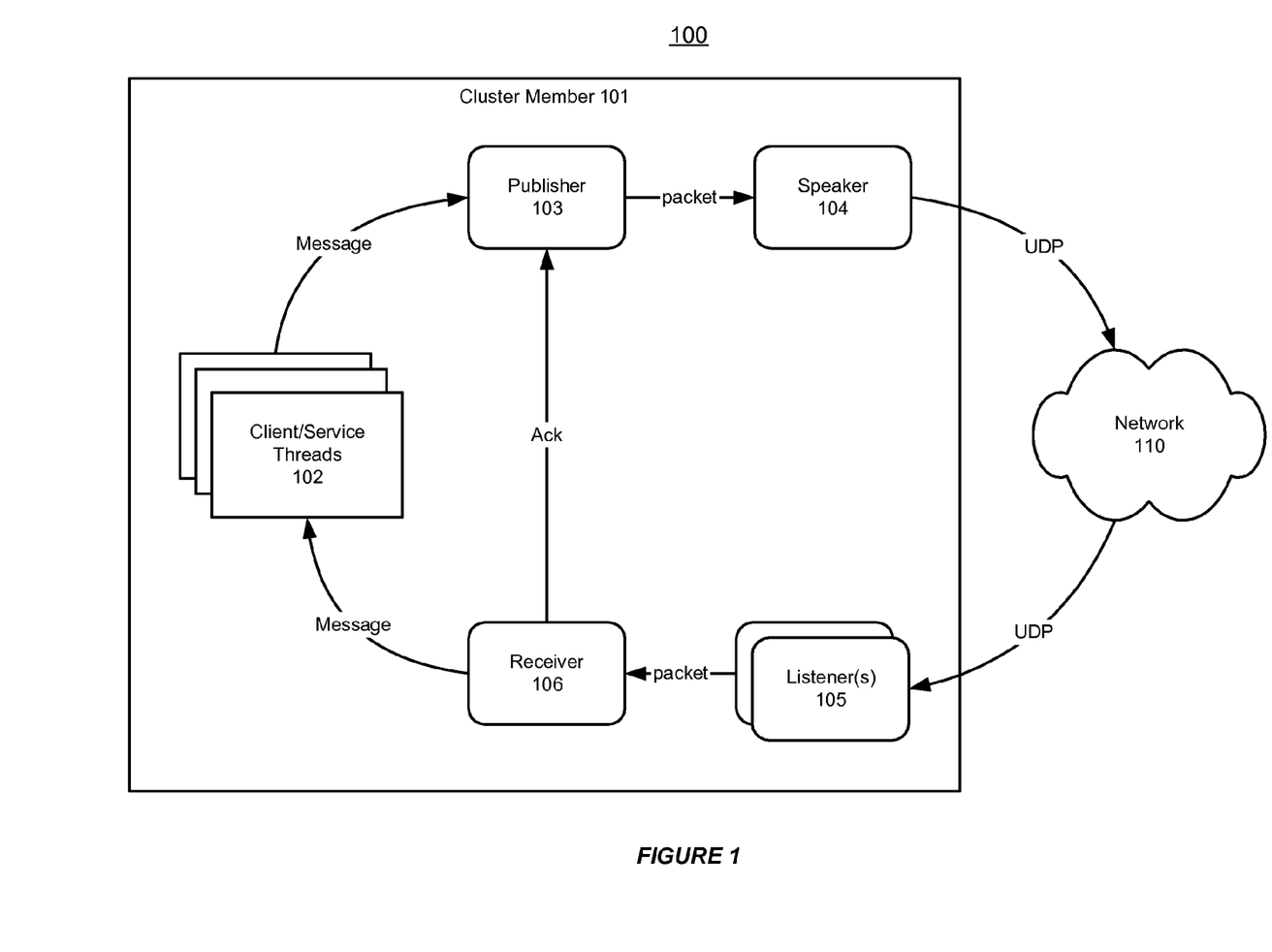
FIG. 1 shows an illustration of supporting message transport based on a datagram layer in a distributed data grid.

FIG. 1 shows an illustration of supporting message transport based on a datagram layer in a distributed data grid. As shown in FIG. 1, a cluster member 101 in a distributed data grid 100 can include one or more client/service threads 102. The client/service threads 102 on the cluster member 101 can send a message to other cluster members in the distributed data grid 100 through a network, e.g. an Ethernet network 110, using a user datagram protocol (UDP).

In accordance with an embodiment of the invention, the cluster member 101 can employ different logics, such as packetization logic, packet retransmission logic, and Ack/Nack logic, for sending a message to another cluster member in the distributed data grid 100 and receiving a response message.

Additionally, the above messaging process can involve multiple context switches. As shown in FIG. 1, the client/service thread 102 can first send the message to a publisher 103. Then, the publisher 103 can forward the message to a speaker 104, which is responsible for sending the message to the network 110.

Furthermore, the cluster member 101 in a distributed data grid 100 can receive a response message using one or more listeners 105, which can forward the received message to a receiver 106. Then, the receiver 106 can forward the received message to the client/service thread 102 and, optionally, notify the publisher 103.

Scalable Message Bus

In accordance with an embodiment of the invention, a scalable message bus can be used for eliminating I/O bottlenecks at various levels.

Figure 2:
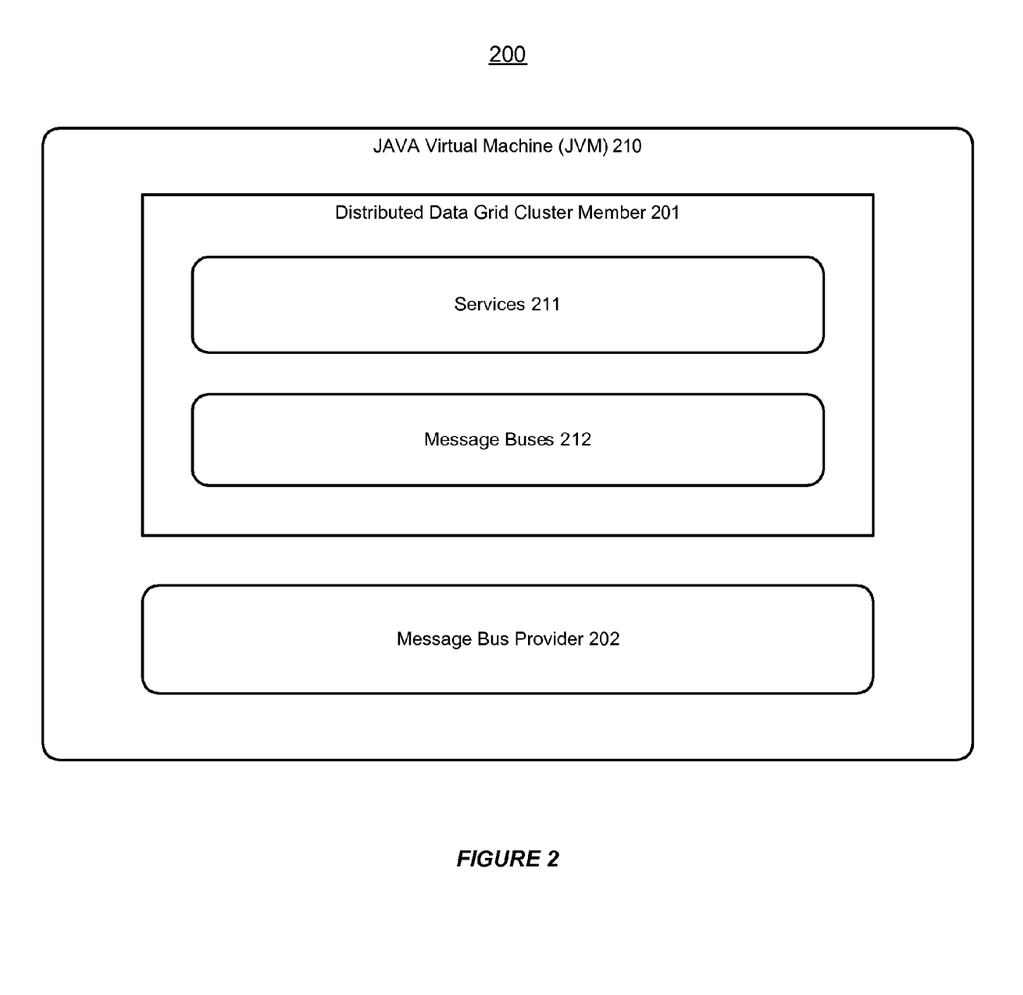
FIG. 2 shows an illustration of providing a message bus in a distributed data grid, in accordance with an embodiment of the invention.

FIG. 2 shows an illustration of providing a message bus in a distributed data grid, in accordance with an embodiment of the invention. As shown in FIG. 2, a cluster member 201 can run on a virtual machine 210, e.g. a JAVA virtual machine, in a distributed data grid 200. The cluster member 201 can involve one or more services 211, which can use one or more message buses 212 for messaging.

In accordance with an embodiment of the invention, the message buses 212 can be based on a binary low-level message transport layer, with multi-point addressing and reliable ordered delivery. Also, the message bus can be based on pure Java implementation and/or native implementations, and can employ an asynchronous event based programming model.

Furthermore, the message bus 212 can be supported using a networking hardware and software subsystem, e.g. an Exabus in Oracle ExaLogic engineered system. The message bus can not only make applications running faster, and can also make the applications running more efficiently. Moreover, and the message bus can make applications running consistently and predictably, even in extremely large scale deployments with thousands of processor cores and terabytes of memory and for virtually all business applications.

In accordance with an embodiment of the invention, each of the message buses 212 can be a provider-based transport layer, which can be supported by using a message bus provider 202 in the virtual machine 210, such as JRockit/HotSpot.

Additionally, the message bus provider 202 can be based on a pluggable provider based framework. For example, the message bus provider 202 can support different message buses such as a SocketBus, which is based on TCP/SDP, and an InfiniBus, which is based on Infiniband RDMA.

In accordance with an embodiment of the invention, the message bus provider can use a single switch to select from a bus protocol from a plurality of bus protocols. For example, in Coherence, the system can specify the single switch in the following configuration file Dtangosol.coherence.transport.reliable=protocol
<cluster-config>!
<unicast-listener>!
<reliable-transport>protocol</reliable-transport>

Additionally, in Coherence, the system can use the single switch to select one of the following buses, such as tmb: TCP MessageBus
sdmb: SDP MessageBus
imb: Infiniband MessageBus
datagram: legacy UDP (default)

Thus, the message buses 212 can improve intra-node scalability in the distributed data grid 200, and can make the distributed data grid 200 protocol agnostic. For example, using the message buses 212, the distributed data grid 200 can effectively utilize large number of cores, improve messaging concurrency, and increase throughput and reduce latency. Also, the message buses 212 allow the distributed data grid 200 to minimize context switches and take advantage of the zero copy.

In accordance with an embodiment of the invention, the system can trigger death detection on the cluster member when a message bus fails.

Figure 3:
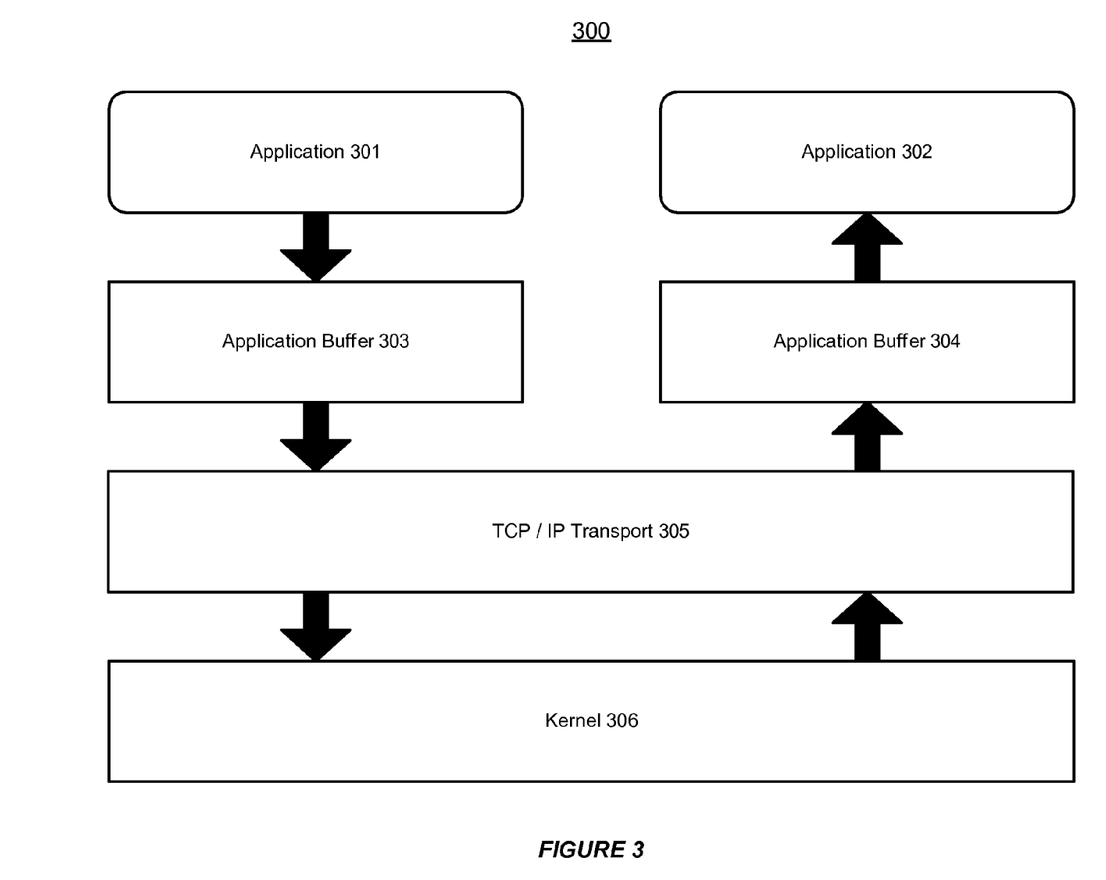
FIG. 3 shows an illustration of using a TCP/IP based transport layer to support messaging in a distributed data grid.

FIG. 3 shows an illustration of using a TCP/IP based transport layer to support messaging in a distributed data grid. As shown in FIG. 3, in order to send a message from application 301 to application 302 in a distributed computing environment 300, the message may need to go through an application buffer 303, a TCP/IP transport layer 305 and a kernel layer 306 on a local machine. Then, the message can be received at remote machine in an application buffer 304, via the kernel layer 306 and the TCP/IP transport layer 305 in the remote machine.

Figure 4:
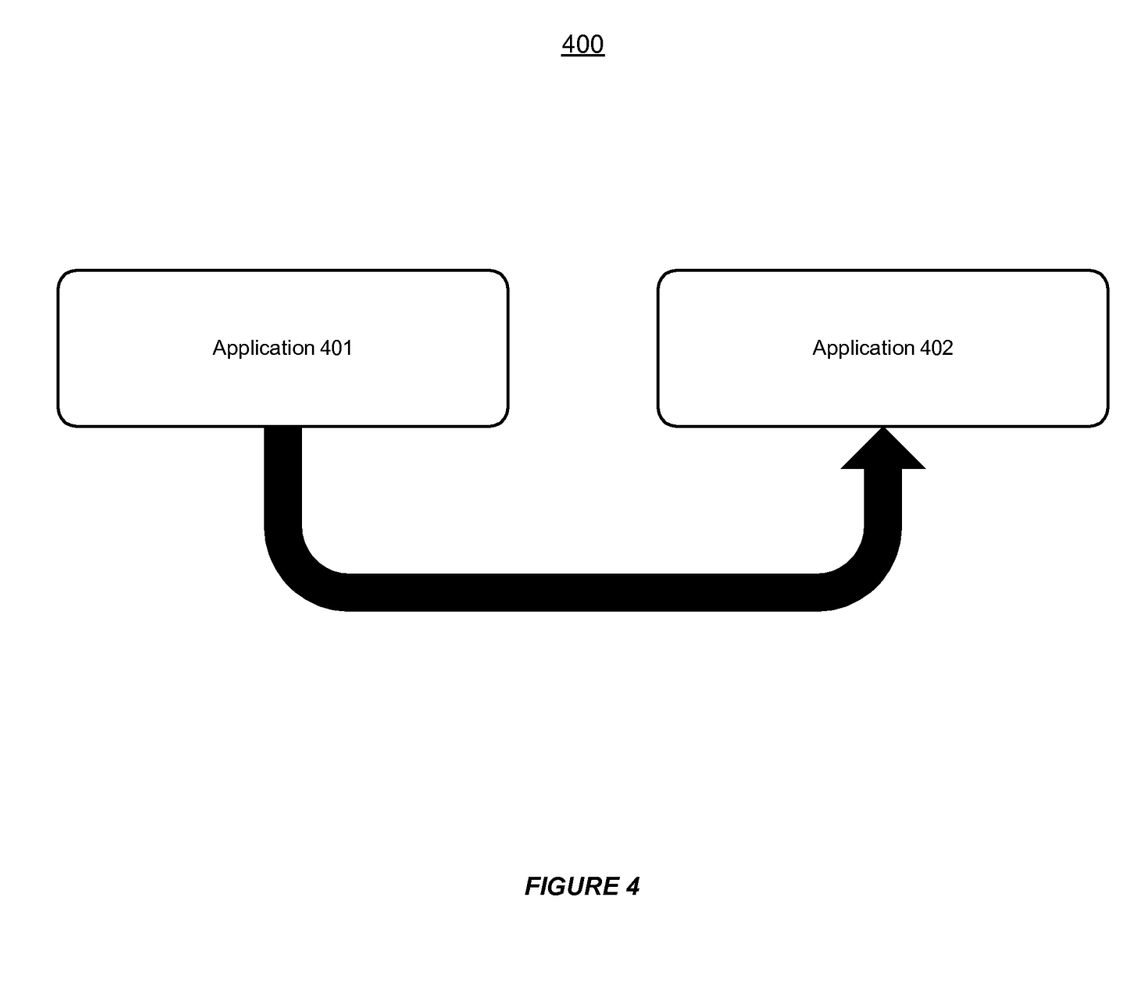
FIG. 4 shows an illustration of using a RDMA based transport layer to support messaging in a distributed data grid, in accordance with an embodiment of the invention.

FIG. 4 shows an illustration of using a RDMA based transport layer to support messaging in a distributed data grid, in accordance with an embodiment of the invention. As shown in FIG. 4, the system can send a message from an application 401 on a local machine directly to an application 401 on a remote machine, based on the RDMA based transport layer.

Bus per Service

In accordance with an embodiment of the invention, a scalable message bus can provide each service with its own bus (or transport engine).

Figure 5:
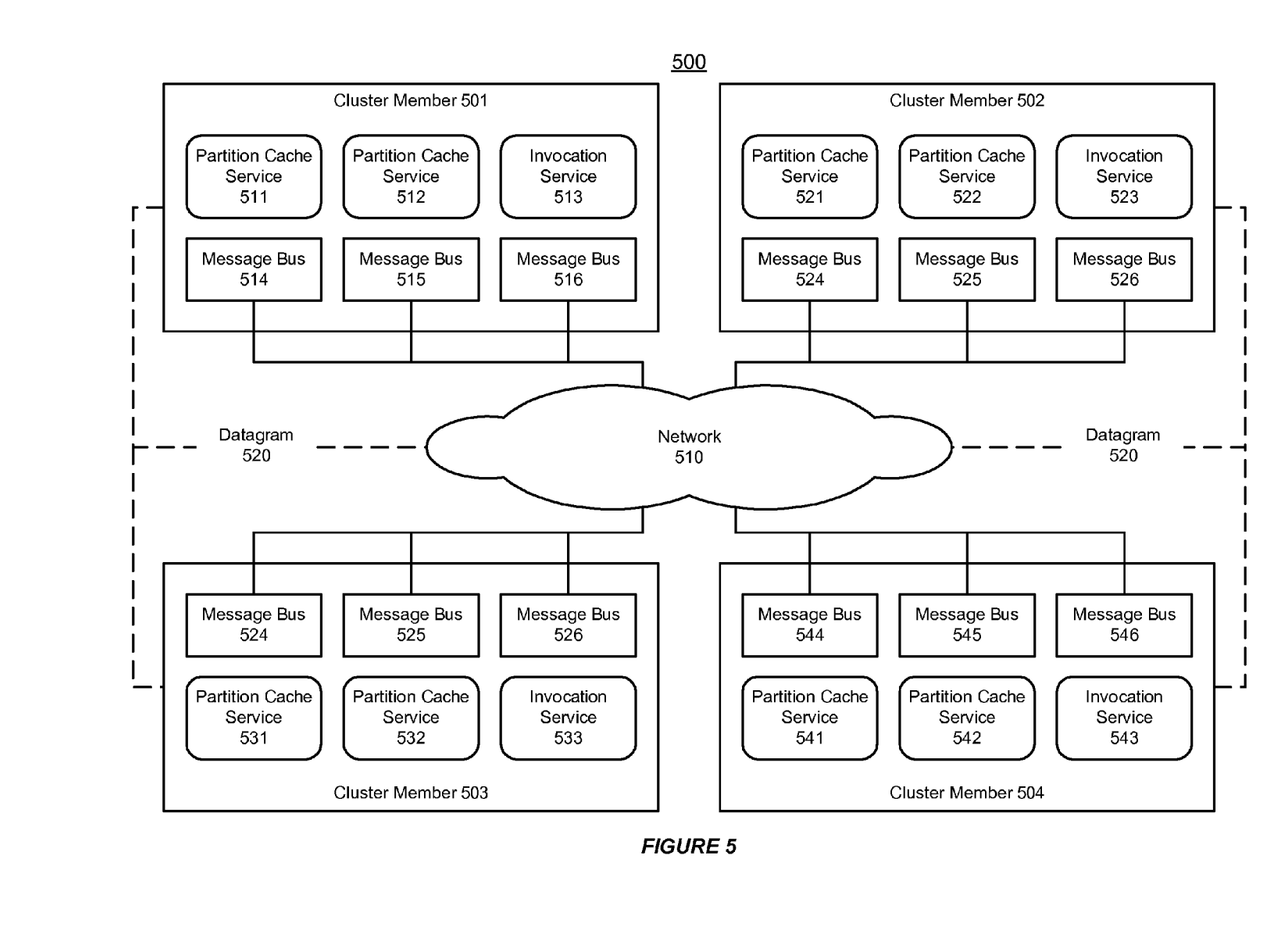
FIG. 5 shows an illustration of supporting bus per service in a distributed data grid, in accordance with an embodiment of the invention.

FIG. 5 shows an illustration of supporting a scalable message bus for various services in a distributed data grid, in accordance with an embodiment of the invention. As shown in FIG. 5, a distributed data grid 500 can include multiple cluster members, e.g. cluster members 501-504.

Furthermore, each cluster member can include different services, each of which can be associated with a separate message bus. For example, the cluster member 501 can include partition cache services 511-512 and invocation service 513, which can be associate with message buses 514-516; the cluster member 502 can include partition cache services 521-522 and invocation service 523, which can be associate with message buses 524-526; the cluster member 503 can include partition cache services 531-532 and invocation service 533, which can be associate with message buses 534-536; and the cluster member 504 can include partition cache services 541-542 and invocation service 543, which can be associate with message buses 544-546.

Additionally, a network 510 can connect different message buses on different cluster members 501-504 in the distributed data grid 500. For example, the network 510 can be based on a remote direct memory access (RDMA) protocol. Moreover, the network 510 can fall back on a user datagram protocol (UDP) if necessary.

In accordance with an embodiment of the invention, the system can use the plurality of message buses to support data transferring between different cluster members in the distributed data grid. Additionally, the system can use a datagram layer 520 to support clustering in the distributed data grid, and can bypass the datagram layer 520 in the distributed data grid for data transferring.

Thus, the system allows an increase in CPU utilization relative to the number of services configured by the end user. Unlike in a traditional networking model, a single transport engine can be provided per service instead of per cluster node, such that the distributed data grid can relieve the bottleneck when too many processors try to utilize a single cluster node.

Figure 6:
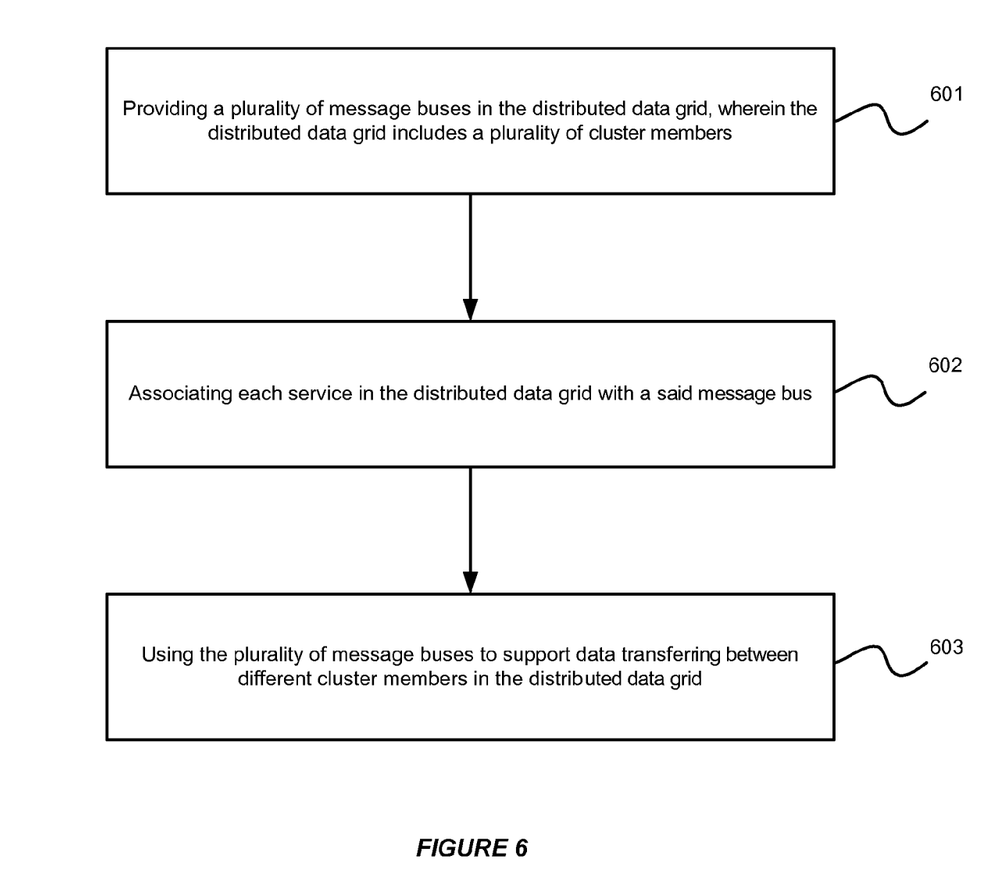
FIG. 6 illustrates an exemplary flow chart for supporting bus per service in a distributed data grid, in accordance with an embodiment of the invention.

FIG. 6 illustrates an exemplary flow chart for supporting message transport based on a provider-based transport layer in a distributed data grid, in accordance with an embodiment of the invention. As shown in FIG. 6, at step 601, the system can provide a plurality of message buses in the distributed data grid, wherein the distributed data grid includes a plurality of cluster members. Furthermore, at step 602, the system can associate each service in the distributed data grid with a said message bus, and, at step 603, the system can use the plurality of message buses to support data transferring between different cluster members in the distributed data grid.

Parallel Message Deserialization

In accordance with an embodiment of the invention, a pool of threads can be used to provide threads, such as input/output (I/O) threads, for driving a scalable message bus to handle inbound messages in a distributed data grid, e.g. a Coherence data grid. Furthermore, by offloading the messages to a thread pool within the distributed data grid and deserialize the message up front on the I/O thread, the system can minimize the impact of the service thread bottleneck.

Figure 7:
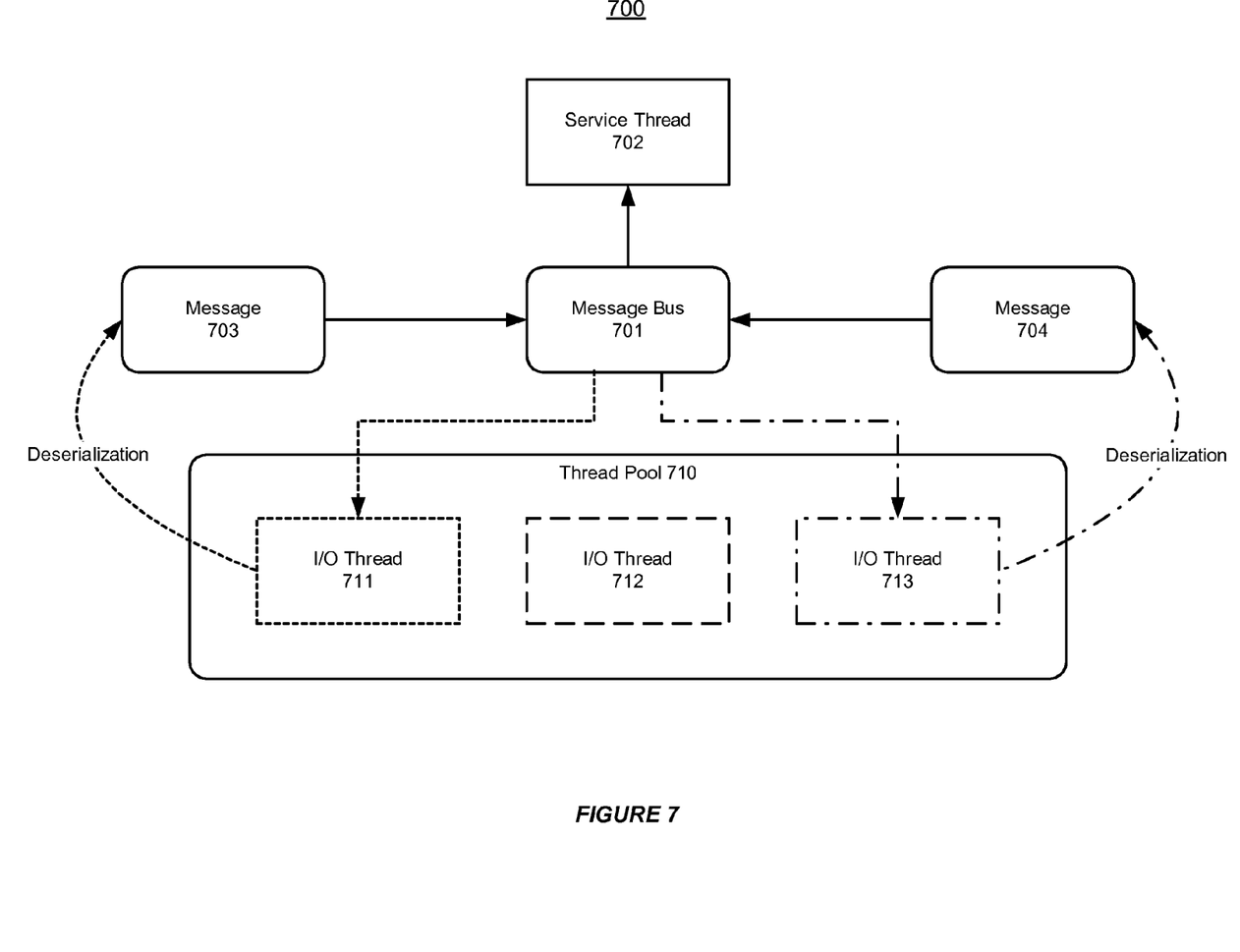
FIG. 7 shows an illustration of supporting parallel message deserialization in a distributed data grid, in accordance with an embodiment of the invention.

FIG. 7 shows an illustration of supporting parallel message deserialization in a distributed data grid, in accordance with an embodiment of the invention. As shown in FIG. 7, a service thread 702 in a distributed data grid 700 can be associated with a message bus 701, which can receive one or more incoming messages, e.g. messages 703-704.

Furthermore, the message bus 701 can be associated with a thread pool 710, which contains one or more threads, e.g. I/O threads 711-713. The distributed data grid 700 can take advantage of this thread pool 710 to relieve the performance bottleneck at the service thread 702.

In accordance with an embodiment of the invention, the distributed data grid 700 can use multiple different I/O threads 711-713 in the thread pool 710 to process the incoming messages 703-704 in parallel. Thus, the system can avoid the service thread bottleneck caused by performing all message deserialization in a single threaded before the message type can be identified.

For example, when the direct memory access (RDMA) protocol is used, the message bus 701 can use the I/O thread 711 to deserialize the message 703, before delivering the incoming message 703 to the service thread 702. Also, the message bus 701 can use the I/O thread 713 to deserialize the message 704, before delivering the incoming message 704 to the service thread 702.

Figure 8:
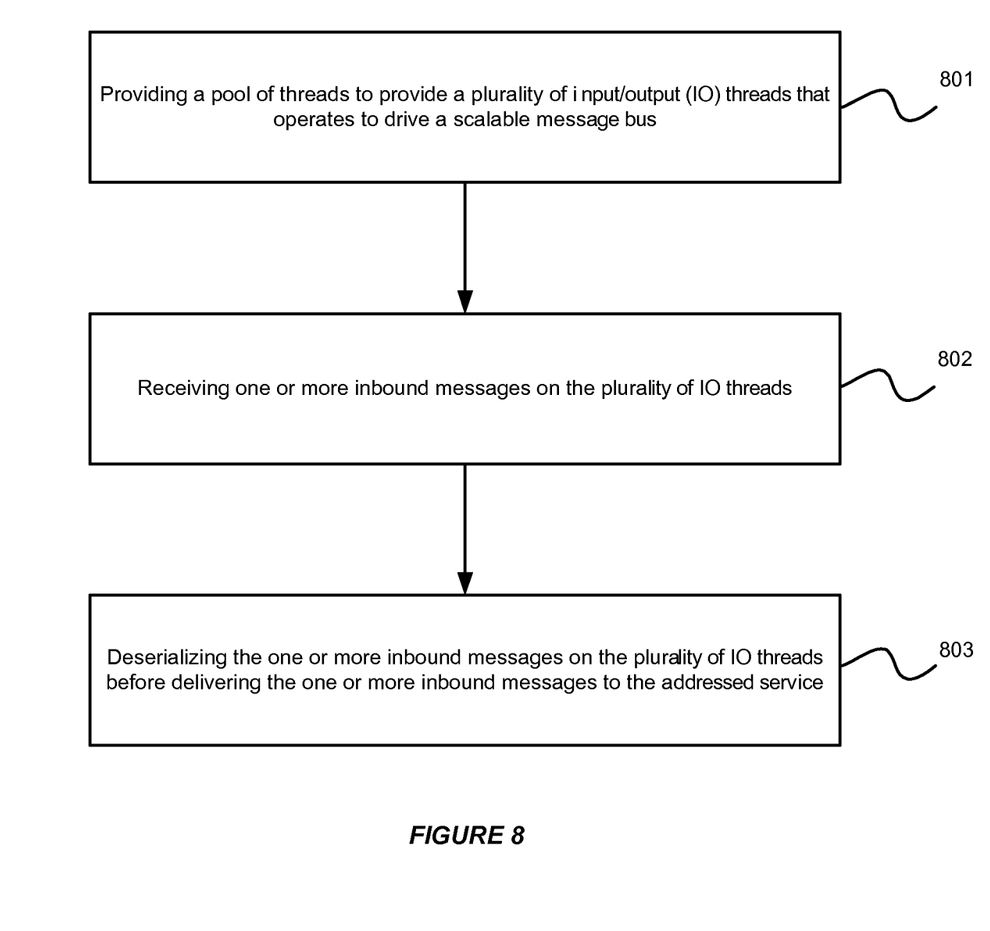
FIG. 8 illustrates an exemplary flow chart for supporting parallel message deserialization in a distributed data grid, in accordance with an embodiment of the invention.

FIG. 8 illustrates an exemplary flow chart for supporting parallel message deserialization in a distributed data grid, in accordance with an embodiment of the invention. As shown in FIG. 8, at step 801, the system can provide a pool of threads to provide a plurality of input/output (I/O) threads that operates to drive a scalable message bus. Furthermore, at step 802, the system can receive one or more inbound messages on the plurality of IO threads, and, at step 803, the system can deserialize the one or more inbound messages on the plurality of I/O threads before delivering the one or more inbound messages to the addressed service.

Message Pre-Processing

In accordance with an embodiment of the invention, a scalable message bus can provide message pre-processing capability, which allows pre-processing the received messages, e.g. on the input/output (I/O) thread, before delivering the received messages to a service thread.

Figure 9:
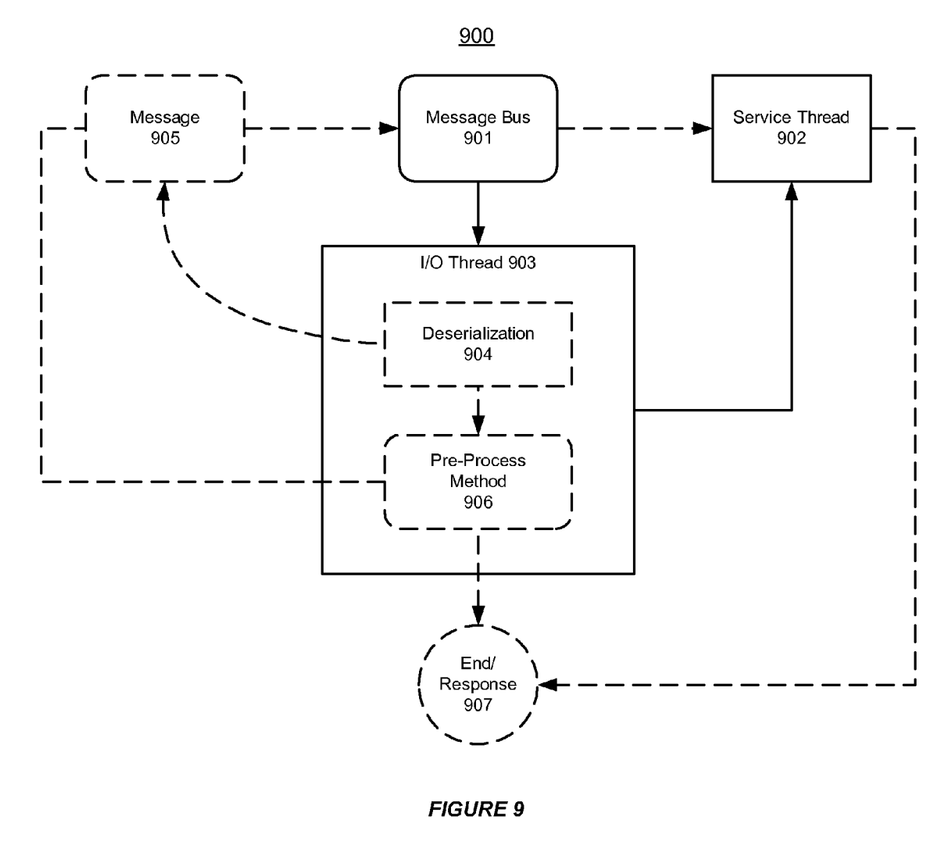
FIG. 9 shows an illustration of supporting message pre-processing in a distributed data grid, in accordance with an embodiment of the invention.

FIG. 9 shows an illustration of supporting message pre-processing in a distributed data grid, in accordance with an embodiment of the invention. As shown in FIG. 9, a service thread 902 in the distributed data grid 900 can be associated with a message bus 901.

The message bus 901 can use one or more I/O threads, e.g. an I/O thread 903, to receive one or more incoming messages, e.g. a message 905. Additionally, the message bus 901 can use the I/O thread 903 to deserialize the incoming message 905.

Once the incoming message 905 is deserialized, the message bus 901 can pre-process the incoming message 905, before delivering it to the service thread 902. Then, the service thread 902 can further complete processing the pre-processed incoming messages 905, and, if necessary, can send a response 907 back to the service requester that sends the incoming message 905.

In accordance with an embodiment of the invention, the incoming message 905 can provide a pre-process method 906. The message bus 901 can execute the pre-process method 906 associated with the incoming message 905 on the I/O thread 903, in order to partially or fully process the incoming message 905. Furthermore, for various message types, it may be possible to completely handle the message execution (reaching the end/response 907 during the pre-processing phase) and avoid the service thread entirely.

In accordance with an embodiment of the invention, the message pre-processing capability of the scalable message bus can be beneficial when it is used in the distributed data grid 900. First, by taking advantage of the message pre-processing capability, the system can avoid overburden the service thread, since the service thread can be a bottleneck in the distributed data grid. Second, using message pre-processing, the system avoids the context switches that may be required when moving the message between the I/O thread 903 and the service thread 902. Such context switches can cause a significant percentage of the overall request latency, e.g. in the case of a remote direct memory access (RDMA) based transport. Third, the scalable message bus allows the messages to be fully executed in parallel if the scalable message bus has multiple 10 threads such as in the case of a RDMA based bus.

Furthermore, the scalable message bus can combine the message pre-processing capability with the parallel message deserialization capability, so that multiple incoming messages can be deserialized and pre-processed in parallel.

Figure 10:
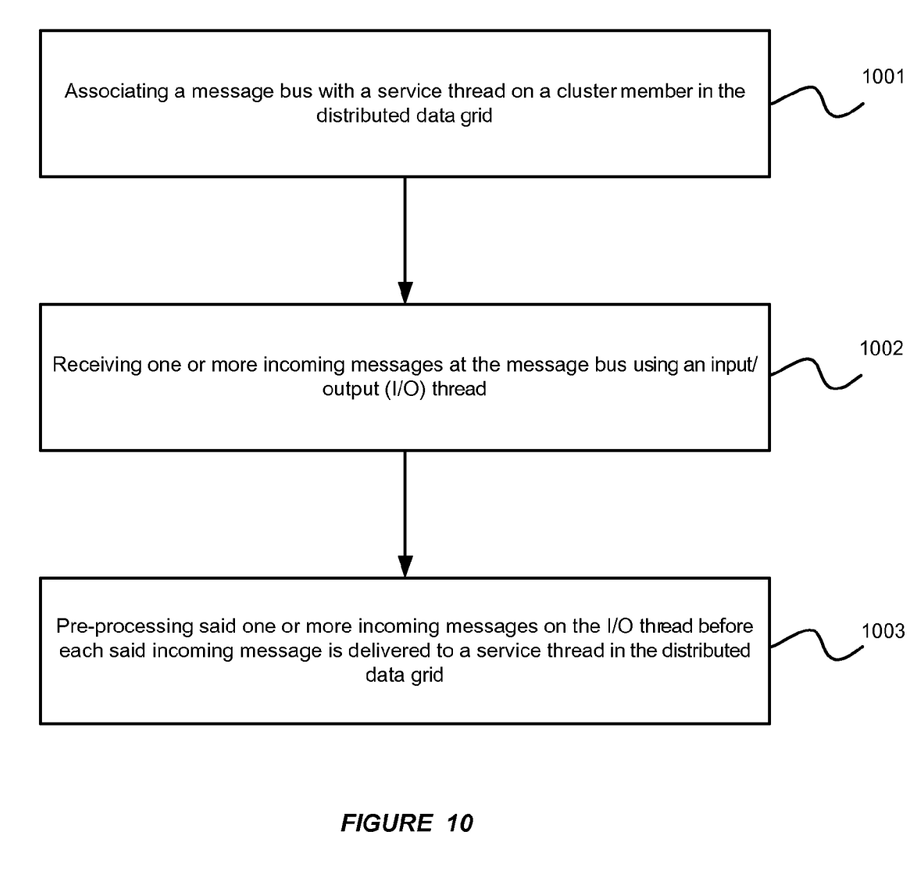
FIG. 10 illustrates an exemplary flow chart for supporting message pre-processing in a distributed data grid, in accordance with an embodiment of the invention.

FIG. 10 illustrates an exemplary flow chart for supporting message pre-processing in a distributed data grid, in accordance with an embodiment of the invention. As shown in FIG. 10, at step 1001, the system can associate a message bus with a service thread on a cluster member in the distributed data grid. Furthermore, at step 1002, the system can receive one or more incoming messages at the message bus using an input/output (I/O) thread, and, at step 1003, the system can pre-process said one or more incoming messages on the I/O thread before each said incoming message is delivered to a service thread in the distributed data grid.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a scalable message bus in a distributed data grid comprising a plurality of cluster members each operating on one or more microprocessors and each providing a plurality of services, the method comprising:
providing a plurality of message buses on each cluster member of the plurality of cluster members in the distributed data grid;
associating each message bus of said plurality of message busses with a separate service of said plurality of services provided by said each cluster member of the plurality of cluster members; and
using the plurality of message buses to support data transferring over a network between said plurality of services provided by said each cluster member of the plurality of cluster members and different services on different cluster members in the distributed data grid; and
wherein said data transferring over the network using said plurality of message busses bypasses a datagram layer of the distributed data grid.

2. The method according to claim 1, further comprising:
using the datagram layer to support clustering of the plurality of cluster members in the distributed data grid.

3. The method according to claim 1, wherein:
said plurality of services comprise at least a cache service and an invocation service.

4. The method according to claim 1, further comprising:
providing a message bus provider on said each cluster member of said plurality of cluster members to support the plurality of message buses on said each cluster member of said plurality of cluster members.

5. The method according to claim 4, wherein:
providing a message bus provider comprises providing a pluggable message bus provider which supports a plurality of pluggable message bus transport protocols.

6. The method according to claim 5, further comprising:
providing a configuration file for said message bus provider which uses a single switch to select from said plurality of message bus transport protocols.

7. The method according to claim 1, further comprising:
triggering death detection of said each cluster member of said plurality of cluster members upon failure of a message bus of the plurality of message busses on said each cluster member.

8. The method according to claim 1, further comprising:
configuring each message bus of the plurality of message busses of each cluster member to utilize a thread pool for parallel processing of messages of said data transferring over the network.

9. The method according to claim 1, wherein:
said data transferring over the network using said plurality of message busses bypasses a datagram layer of the distributed data grid and uses a remote direct memory access (RDMA) protocol.

10. The method according to claim 1, further comprising:
allowing the network to fall back on a user datagram protocol (UDP).

11. A system for supporting a scalable message bus in a distributed data grid, comprising:
a plurality of computer servers each comprising a microprocessor and memory;
a network connecting the plurality of computer servers;
a plurality of cluster members operating on the plurality of computer servers wherein each of the plurality of cluster members provides a plurality of services;
a plurality of message buses on each cluster member of the plurality of cluster members in the distributed data grid, wherein each message bus of said plurality of message busses is associated with a separate service of said plurality of services provided by said each cluster member of the plurality of cluster members; and
wherein the plurality of message buses are used to support data transferring over the network between said plurality of services provided by said each cluster member of the plurality of cluster members and different services on different cluster members in the distributed data grid; and
wherein said data transferring over the network using said plurality of message busses bypasses a datagram layer of the distributed data grid.

12. The system according to claim 11, wherein:
the distributed data grid is configured to use a datagram layer to support clustering of the plurality of cluster members in the distributed data grid.

13. The system according to claim 11, wherein:
said plurality of services comprise at least a cache service and an invocation service.

14. The system according to claim 11, further comprising:
a message bus provider on said each cluster member of said plurality of cluster members, wherein the message bus provider supports the plurality of message buses on said each cluster member of said plurality of cluster members.

15. The system according to claim 11, further comprising:
a pluggable message bus provider on said each cluster member of said plurality of cluster members, wherein the pluggable message bus provider supports the plurality of message buses on said each cluster member of said plurality of cluster members; and
wherein the pluggable message provider supports a plurality of pluggable message bus transport protocols.

16. The system according to claim 11, further comprising:
a pluggable message bus provider on said each cluster member of said plurality of cluster members, wherein the pluggable message bus provider supports the plurality of message buses on said each cluster member of said plurality of cluster members;
wherein the pluggable message provider supports a plurality of pluggable message bus transport protocols; and
a configuration file associated with said message bus provider which uses a single switch to select from the plurality of message bus transport protocols.

17. The system according to claim 11, wherein:
the distributed data grid is configured to trigger death detection of said each cluster member of said plurality of cluster members upon failure of a message bus of the plurality of message busses on said each cluster member.

18. The system according to claim 11, wherein:
each message bus of the plurality of message busses of each cluster member is configured to utilize a thread pool for parallel processing of messages of said data transferring over the network.

19. The system according to claim 11, wherein:
said data transferring over the network using said plurality of message busses uses a remote direct memory access (RDMA) protocol.

20. A non-transitory machine readable storage medium having instructions stored thereon for supporting a scalable message bus in a distributed data grid comprising a plurality of cluster members each operating on one or more microprocessors and each providing a plurality of services, which instructions, when executed on each cluster member of the plurality of cluster members cause each cluster member to perform steps comprising:
providing a plurality of message buses on each cluster member of the plurality of cluster members in the distributed data grid;
associating each message bus of said plurality of message busses with a separate service of said plurality of services provided by said each cluster member of the plurality of cluster members; and
using the plurality of message buses to support data transferring over a network between said plurality of services provided by said each cluster member of the plurality of cluster members and different services on different cluster members in the distributed data grid; and
wherein said data transferring over the network using said plurality of message busses bypasses a datagram layer of the distributed data grid.

* * * * *